United States Patent
Bryant et al.

(10) Patent No.: US 12,449,075 B2
(45) Date of Patent: Oct. 21, 2025

(54) AIRCRAFT PIPEWORK ASSEMBLY

(71) Applicant: AIRBUS OPERATIONS LIMITED, Bristol (GB)

(72) Inventors: Anthony Bryant, Bristol (GB); Callum Johnson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 181 days.

(21) Appl. No.: 18/518,143

(22) Filed: Nov. 22, 2023

(65) Prior Publication Data
US 2024/0175527 A1 May 30, 2024

(30) Foreign Application Priority Data
Nov. 25, 2022 (GB) ..................... 2217744

(51) Int. Cl.
*F16L 27/02* (2006.01)
*B64D 37/00* (2006.01)
(Continued)

(52) U.S. Cl.
CPC .......... *F16L 27/023* (2013.01); *B64D 37/005* (2013.01); *F16L 3/16* (2013.01); *B64D 37/30* (2013.01); *F16L 9/18* (2013.01)

(58) Field of Classification Search
CPC ... F16L 27/023; F16L 3/16; F16L 9/18; F16L 5/00; F16L 27/026; F16L 27/04;
(Continued)

(56) References Cited

U.S. PATENT DOCUMENTS 3,695,644 A * 10/1972 Goldberg ............ F16L 27/1136
285/146.1
4,676,472 A * 6/1987 Kamrud, Sr. ........... B25B 5/003
248/278.1
(Continued)

FOREIGN PATENT DOCUMENTS

DE 102005047951 A1 4/2007
EP 2634467 A1 9/2013
(Continued)

OTHER PUBLICATIONS

EP Search Report for Application No. 23211593.1-1004, dated Apr. 11, 2024, four pages.
(Continued)

*Primary Examiner* — Muhammad Ijaz
(74) *Attorney, Agent, or Firm* — Nixon & Vanderhye P.C.

(57) ABSTRACT

An aircraft pipework assembly is disclosed including an aircraft structure; pipework; a fixture arrangement between the pipework and the aircraft structure; a tie rod connecting the pipework to the aircraft structure; a first tie rod bearing which connects the tie rod to the pipework; and a second tie rod bearing which connects the tie rod to the aircraft structure. The fixture arrangement includes a spherical bearing, the spherical bearing comprising a ball mounted to the pipework, and a housing coupled to the aircraft structure. The ball includes a convex spherical bearing surface; and the housing comprises a concave spherical bearing surface which mates with the convex spherical bearing surface of the ball. The fixture arrangement is configured to enable the pipework to translate relative to the ball in an axial direction aligned with a longitudinal axis of the pipework.

16 Claims, 6 Drawing Sheets

(51) Int. Cl.
*F16L 3/16* (2006.01)
*B64D 37/30* (2006.01)
*F16L 9/18* (2006.01)

(58) Field of Classification Search
CPC ...... B64D 37/005; B64D 37/30; B64D 37/00; Y02T 50/678
USPC .................................... 248/70, 663, 288.31
See application file for complete search history.

(56) References Cited

U.S. PATENT DOCUMENTS

| | | | | |
|---|---|---|---|---|
| 5,109,321 | A * | 4/1992 | Maglica | F21V 21/145 |
| | | | | 700/86 |
| 5,171,042 | A * | 12/1992 | Faidiga | F16L 13/0263 |
| | | | | 285/55 |
| 6,220,556 | B1 * | 4/2001 | Sohrt | F16C 11/106 |
| | | | | 403/56 |
| 6,264,139 | B1 * | 7/2001 | Dazet | B64C 25/10 |
| | | | | 244/102 R |
| 6,352,227 | B1 * | 3/2002 | Hathaway | F21V 21/29 |
| | | | | 403/56 |
| 11,623,539 | B1 * | 4/2023 | Brady | H01R 13/6315 |
| | | | | 248/70 |
| 2006/0076773 | A1 * | 4/2006 | Baharav | B29C 65/3432 |
| | | | | 285/146.1 |
| 2006/0082142 | A1 * | 4/2006 | Berchtold | F16L 21/06 |
| | | | | 285/261 |
| 2010/0295293 | A1 * | 11/2010 | Healy | F16L 27/04 |
| | | | | 285/95 |
| 2013/0026751 | A1 * | 1/2013 | Petit | F16L 27/023 |
| | | | | 285/146.1 |
| 2013/0187013 | A1 * | 7/2013 | Minami | F16L 5/10 |
| | | | | 248/70 |
| 2014/0110934 | A1 * | 4/2014 | Berkness | F16L 21/02 |
| | | | | 285/231 |
| 2014/0361533 | A1 * | 12/2014 | Pettersen | F16L 27/04 |
| | | | | 285/263 |
| 2015/0014988 | A1 * | 1/2015 | Menheere | F16L 37/52 |
| | | | | 285/261 |
| 2015/0285405 | A1 * | 10/2015 | Bajracharya | B60R 16/08 |
| | | | | 248/70 |
| 2015/0308597 | A1 * | 10/2015 | Lillmars | F16L 19/00 |
| | | | | 285/261 |
| 2019/0039747 | A1 * | 2/2019 | Gilbertson | F16L 3/222 |
| 2019/0168861 | A1 * | 6/2019 | Fotouhie | B64C 15/12 |
| 2020/0326019 | A1 * | 10/2020 | Hennon | F16L 3/1091 |
| 2021/0270401 | A1 * | 9/2021 | Shambeau | F16L 3/20 |
| 2021/0285571 | A1 * | 9/2021 | Taillon | F16L 3/16 |
| 2023/0086167 | A1 * | 3/2023 | Milliere | A62C 3/08 |
| | | | | 220/88.3 |
| 2023/0175628 | A1 * | 6/2023 | Papaik | F16L 55/00 |
| | | | | 138/103 |
| 2024/0175527 | A1 * | 5/2024 | Bryant | B64D 37/005 |
| 2024/0295281 | A1 * | 9/2024 | Schmidt | F16L 39/005 |

FOREIGN PATENT DOCUMENTS

| | | |
|---|---|---|
| GB | 2576893 A | 3/2020 |
| GB | 2584882 A | 12/2020 |

OTHER PUBLICATIONS

Combined Search and Examination Report for Application No. GB2217744.8, dated May 22, 2023, 6 pages.

* cited by examiner

AIRCRAFT PIPEWORK ASSEMBLY

CROSS RELATED APPLICATION

This application claims priority to United Kingdom Patent Application GB 2217744.8, filed Nov. 25, 2022, the entire contents of which is hereby incorporated by reference.

FIELD OF THE INVENTION

The present invention relates to an aircraft pipework assembly comprising an aircraft structure; pipework; and a fixture arrangement between the pipework and the aircraft structure. Typically, although not exclusively, the pipework may be for conveying liquid hydrogen.

BACKGROUND OF THE INVENTION

Liquid Hydrogen distribution system pipework is more complex than conventional kerosene pipework. To maintain the very low temperatures of liquid hydrogen (−253° C.), the pipework is typically corrosion resistant steel (CRES), double walled and vacuum insulated. The resulting pipework is therefore more rigid than the kerosene equivalent.

For long rigid pipework routed through a wing box, large stresses will be induced into the pipework under wing bending. The pipework may be locally restrained by conventional fixture arrangements such as saddle clamps, clamp blocks or p-clamps. These conventional fixture arrangements do not offer any axial load reaction.

Hydrogen fuel lines typically span long distances across the aircraft wing between the fuel tanks and engines, or fuel tanks and refuel couplings, with the fuel lines expected to bend and twist in accordance with the bend and twist of the wing. The fuel lines attach to at least some of those ribs, presenting a need for fixture arrangements that minimise stress concentrations caused by over-constraint of the fuel lines.

SUMMARY OF THE INVENTION

A first aspect of the invention provides an aircraft pipework assembly comprising: an aircraft structure; pipework; a fixture arrangement between the pipework and the aircraft structure; a tie rod; a first tie rod bearing which connects the tie rod to the pipework; and a second tie rod bearing which connects the tie rod to the aircraft structure; wherein the fixture arrangement comprises a spherical bearing, the spherical bearing comprising a ball mounted to the pipework and a housing coupled to the aircraft structure; the ball comprises a convex spherical bearing surface; the housing comprises a concave spherical bearing surface which mates with the convex spherical bearing surface of the ball; and the fixture arrangement is configured to enable the pipework to translate relative to the ball in an axial direction aligned with a longitudinal axis of the pipework.

Optionally the spherical bearing is configured to enable the pipework to rotate relative to the aircraft structure about three perpendicular axes.

Optionally the spherical bearing is configured to transmit radial load between the pipework and the aircraft structure, and the radial load is normal to the spherical bearing surfaces.

Optionally the concave spherical bearing surface contacts the convex spherical bearing surface of the ball.

Optionally the fixture arrangement further comprises an axial bearing, the axial bearing comprising an inner bearing surface of the ball which mates with an outer surface of the pipework, wherein the axial bearing is configured to enable the pipework to translate relative to the ball in the axial direction.

Optionally the inner bearing surface of the ball contacts the outer surface of the pipework.

Optionally the inner bearing surface of the ball and the outer surface of the pipework are both cylindrical.

Optionally the first tie rod bearing is configured to enable the tie rod to rotate relative to the pipework about two or three perpendicular axes.

Optionally the second tie rod bearing is configured to enable the tie rod to rotate relative to the aircraft structure about two or three perpendicular axes.

Optionally the first tie rod bearing and/or the second tie rod bearing is a spherical bearing.

Optionally the ball comprises an assembly of two or more ball parts which are distributed around a circumference of the pipework.

Optionally the housing comprises an assembly of two or more housing parts which are distributed around a circumference of the pipework.

Optionally the tie rod extends along a tie rod axis between the first tie rod bearing and the second tie rod bearing, and the tie rod axis extends at an acute angle to the axial direction.

Optionally the acute angle is less than 30 degrees or less than 20 degrees or less than 10 degrees.

Optionally the housing is attached to the aircraft structure by fasteners.

Optionally the pipework comprises a pipe assembly, the pipe assembly comprising two or more pipe parts which are distributed in the axial direction and/or distributed radially orthogonal to the axial direction.

Optionally the pipework comprises a double-walled pipe assembly, the double-walled pipe assembly comprising an inner pipe within an outer pipe.

Optionally the pipework is configured to convey fuel, for example hydrogen.

Optionally the pipework further comprises failsafe flanges, one on either side of the aircraft structure. Optionally one of the failsafe flanges is configured to come into contact with the aircraft structure in the event of failure of the tie rod and/or one of the failsafe flanges is configured to come into contact with the housing in the event of failure of the tie rod.

A further aspect of the invention provides an aircraft wing comprising an aircraft pipework assembly according to the first aspect of the invention.

Optionally the aircraft wing further comprises a wing box with upper and lower covers, and ribs joined to the upper and lower covers, wherein the aircraft structure is one of the ribs.

Optionally the pipework passes through a hole in the one of the ribs.

Optionally the one of the ribs has a rib plane which passes through one or both of the spherical bearing surfaces.

Optionally the ribs include an inner-most rib located at a root of the wing box, an outer-most rib at a tip of the wing box, and one or more mid-span ribs between the inner-most and outer-most ribs; wherein the aircraft structure is the inner-most rib.

A further aspect of the invention provides an aircraft wing comprising: a wing rib; pipework; a fixture arrangement between the pipework and the wing rib; and a tie rod connecting the pipework to the wing rib, wherein the fixture arrangement is configured to enable the pipework to rotate relative to the wing rib about three perpendicular axes; and the fixture arrangement is configured to enable the pipework to translate relative to the fixture arrangement in an axial direction aligned with a longitudinal axis of the pipework.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
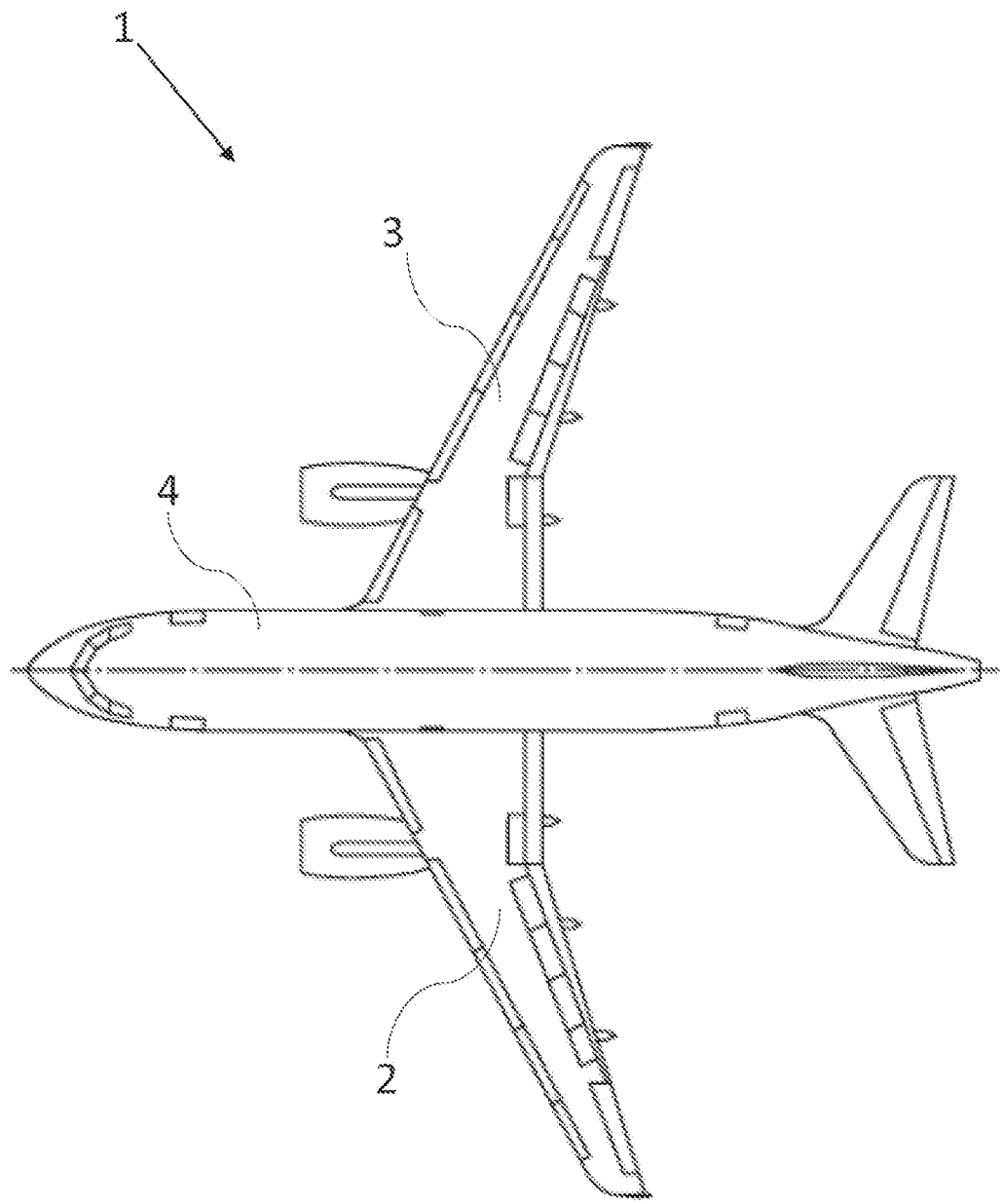
FIG. 1 shows an aircraft.

FIG. 1 shows an aircraft 1 with port and starboard wings 2, 3. Each wing has a cantilevered structure with a length extending in a generally spanwise direction 19 from a root to a tip (shown in FIG. 3), the root being joined to an aircraft fuselage 4. The wings 2, 3 are similar in construction so only the starboard wing 3 will be described in detail with reference to FIGS. 2 and 3.

Figure 2:
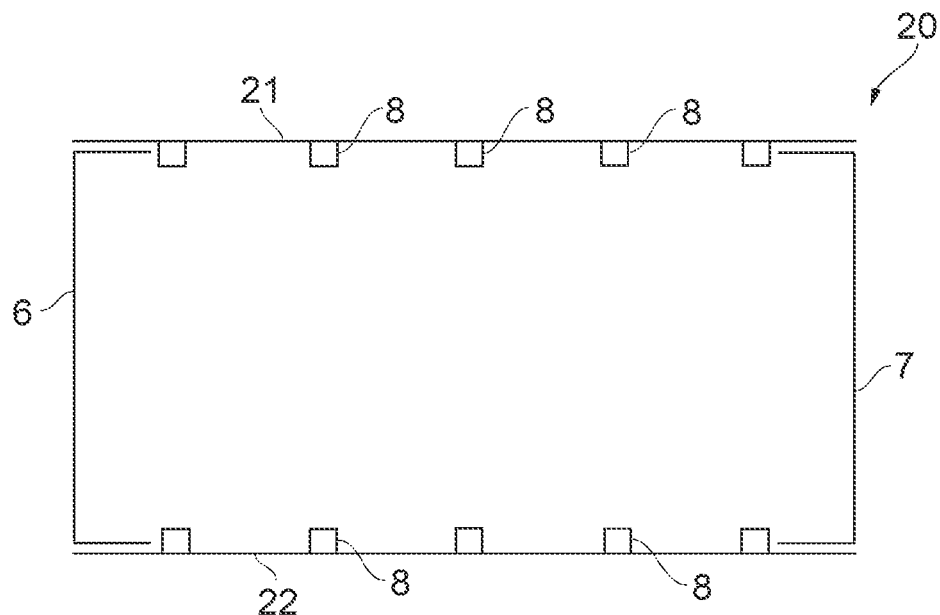
FIG. 2 is a sectional view of a wing box of the starboard wing.
Figure 3:
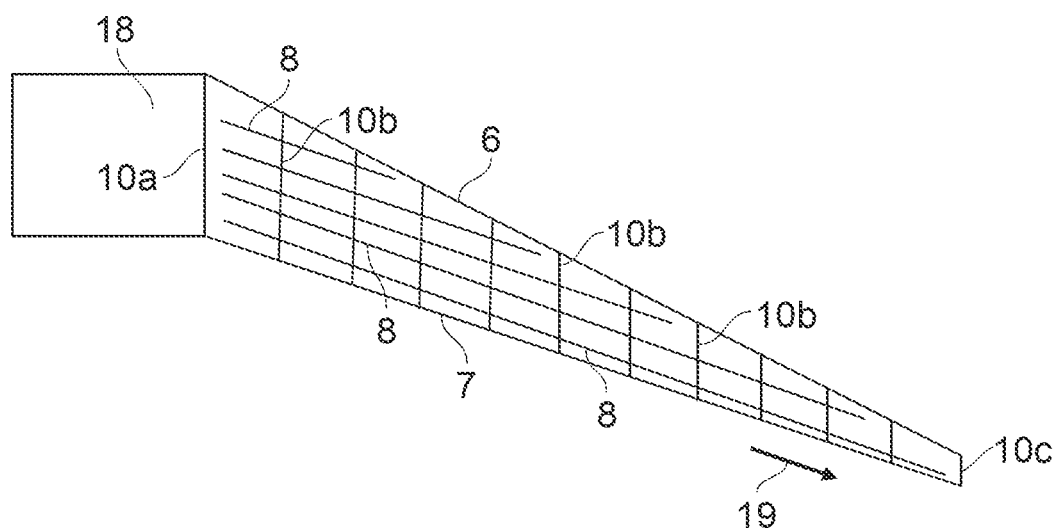
FIG. 3 shows the wing box extending along a wing.

The main structural element of the wing 3 is a wing box 20 that may be formed by upper and lower covers 21, 22 and front and rear spars 6, 7 shown in cross-section in FIG. 2. The covers 21, 22 and spars 6, 7 may each be formed of Carbon Fibre Reinforced Polymer (CFRP) laminate components. Each cover 21, 22 comprises a panel assembly and may have a curved aerodynamic outer surface (e.g. the upper surface of the upper cover 21 and the lower surface of the lower cover 22) over which air flows during flight of the aircraft 1. Each cover 21, 22 has an inner surface carrying a series of stiffeners 8 extending in the spanwise direction 19 (only some of the stiffeners 8 are labelled so as to improve the clarity of the figures). Each stiffener 8 is joined to one cover 21, 22 but not the other.

The wing box 20 has a plurality of transverse ribs, each rib being joined to the covers 21, 22 and the spars 6, 7. The ribs 10 may include an inner-most inboard rib 10a located at the root of the wing box 20, an outer-most outboard rib 10c at the tip of the wing box 20, and one or more mid-span ribs 10b between the inner-most and outer-most ribs 10a, 10c. The inner-most rib 10a may be an attachment rib which forms the root of the wing box 20 and is joined to a centre wing box 18 within the body of the fuselage 4. Each rib 10a, 10b, 10c may connect the upper cover 21 to the lower cover 22. The stiffeners 8 may pass through rib recesses (not shown) in the ribs 10b.

Figure 4:
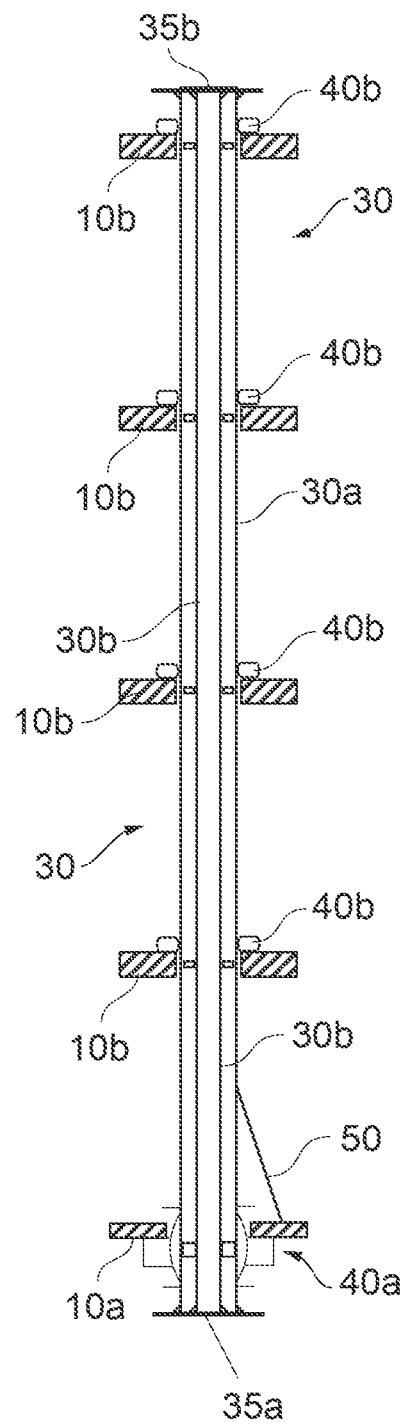
FIG. 4 shows an aircraft pipework assembly with pipework extending along the wing.

Pipework 30 shown in FIG. 4 extends through one of more of the wing ribs 10a, 10b, 10c, for example to convey fuel between an aircraft engine and a fuel tank, or between a refuelling coupler and a fuel tank.

FIG. 4 is a schematic cross-sectional view showing an aircraft pipework assembly comprising pipework 30 extending through the inboard rib 10a at the root of the wing 3, and a series of four of the mid-span ribs 10b. In particular, the pipework 30 passes through the plane of each rib 10a, 10b. The pipework 30 may pass through an aperture in each of the ribs 10a, 10b.

The pipework 30 comprises a double-walled pipe assembly with an outer pipe 30a, and an inner pipe 30b within the outer pipe 30a. The inner pipe 30b is arranged to carry cryogenic fuel, such as liquid hydrogen. To maintain the cryogenic fuel at cryogenic temperatures, it is important to minimise thermal losses from the pipework 30. To achieve this, the interspace between the outer pipe 30a and the inner pipe 30b may be held at a vacuum pressure.

Pipe spacers may be fitted between the outer pipe 30a and the inner pipe 30b to keep the outer and inner pipes 30a, 30b coaxial and transmit radial loads between them. The pipe spacers surround the inner pipe 30a and can be distributed at intervals along the length of the pipework 30.

The pipework 30 is coupled to each rib 10a, 10b by a fixture arrangement 40a or 40b.

The fixture arrangement 40a at the inboard rib 10a is configured to restrict translational movement of the pipework 30 in the longitudinal direction relative to the rib 10a, restrict translational movement of the pipework 30 in the plane of the rib 10a (i.e. radial movement away from a longitudinal axis of the pipework 30), and allow rotation of the pipework 30 relative to the rib 10a about the longitudinal axis. By restricting movement of the pipework 30 along the longitudinal axis at one or more points (in this case only the inboard rib 10a), the pipework 30 is prevented from sliding freely through the wing box 20.

The fixture arrangement 40b at each mid-span rib 10b is configured to restrict translational movement of the pipework 30 in the plane of the rib 10b (i.e. radial movement away from a longitudinal axis of the pipework 30), but allows translational movement in the longitudinal direction (i.e. the direction of the longitudinal axis) and rotation about three perpendicular axes.

In this manner, the pipework 30 is simply supported by the fixture arrangements 40a, 40b such that shear loads are transmitted from the aircraft wing structure, through the ribs 10a, 10b, to the pipework 30, whilst bending loads are minimised or mitigated. This can be particularly important in cryogenic applications due to the increased thickness of the fuel pipes 30a, 30b generally required compared to fuel pipes in non-cryogenic applications.

The fuel pipes 30a, 30b may be formed of relatively stiff materials such as metals, and for example stainless steel.

The fixture arrangement 40a provides a 'master' axial pipe location, and all other fixture arrangements 40b support the pipework 30 radially but allow sliding in the axial direction, thus enabling the pipework 30 to expand/contract thermally.

Optionally the fuel pipes 30a, 30b may be formed from a metal with a low thermal expansion coefficient to reduce such thermal expansion/contraction.

The pipework 30 has a flange fitting 35a at its inboard end, which may be connected to further pipework (not shown) leading to a fuel tank system.

The pipework 30 also has a flange fitting 35b at its outboard end, which may be connected to further pipework (not shown) leading to an engine of the aircraft, or to a refuel coupling or vent outlet.

FIG. 5-9 show an example of the fixture arrangement 40a at the inboard rib 10b. As noted above, the ribs include an inner-most inboard rib 10a located at a root of the wing box, an outer-most outboard rib 10c at a tip of the wing box, and one or more mid-span ribs 10b between the inner-most and outer-most ribs. In this example, the fixture arrangement 40*a* is at the inboard rib 10*b*, but in other embodiments the fixture arrangement 40*a* may be at one or more of the mid-span ribs 10*b*.

The fixture arrangement 40*a* comprises a spherical bearing between the pipework 30 and the aircraft structure (in this case, the rib 10*a*). A tie rod 50 is also provided, connecting the pipework 30 to the rib 10*a*.

The spherical bearing comprises a ball mounted to the pipework 30, and a housing coupled to the rib 10*a*.

Figure 8:
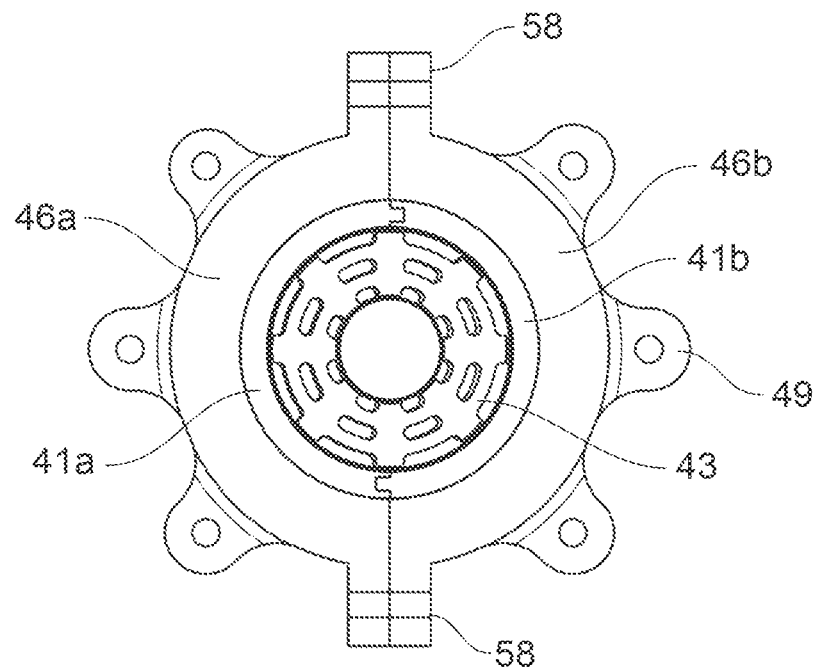
FIG. 8 is an end view of the fixture arrangement.
Figure 9:
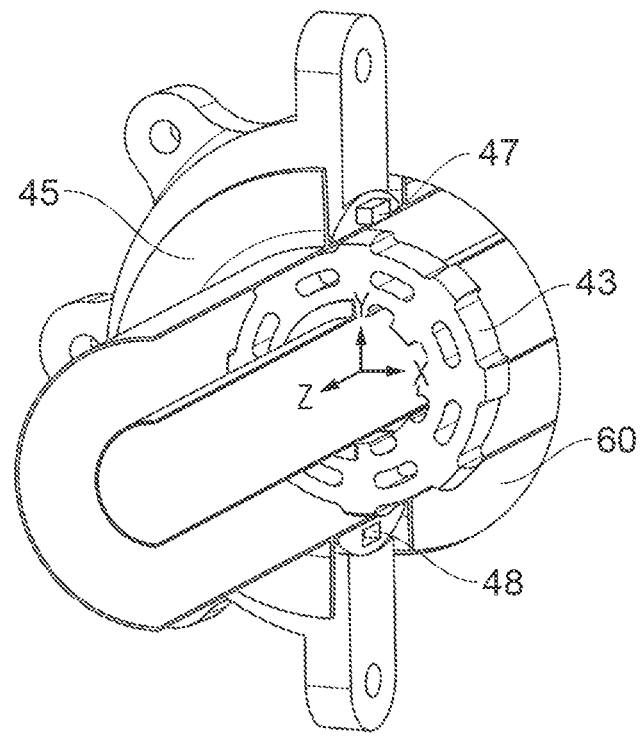
FIG. 9 is an isometric view of the fixture arrangement, partially in section.

The ball comprises an assembly of two ball parts 41*a*, 41*b* which are distributed around a circumference of the pipework as shown in FIG. 8. As shown in FIG. 9, each ball part 41*a*, 41*b* comprises a projection 47 which fits into a recess 48 of the other ball part.

The ball parts 41*a*, 41*b* may be metallic or GFRP (glass fibre reinforced plastic) materials—for example G10 GFRP or G11 GFRP. Optionally the ball parts 41*a*, 41*b* comprise a thermoplastic material.

Figure 6:
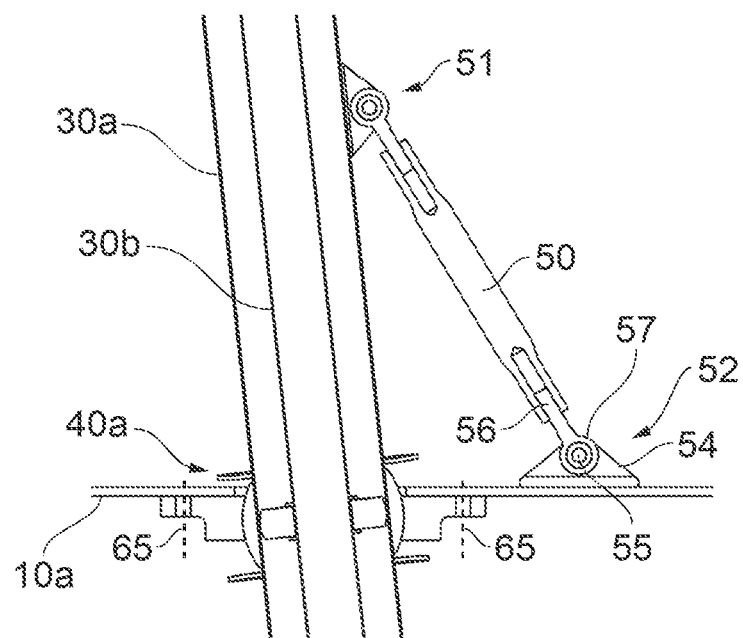
FIG. 6 shows the fixture arrangement of FIG. 5 in cross-section.

As shown in FIG. 8, the housing comprises an assembly of two housing parts 46*a*, 46*b* which are distributed around a circumference of the pipework. Each housing part 46*a*, 46*b* has lugs 49 which are attached to the rib 10*a* by fasteners 65, such as bolts, as shown in FIG. 6. Each housing part 46*a*, 46*b* also has a pair of lugs 58 which are attached to the lugs 58 of the other housing part by fasteners, such as bolts (not shown).

Providing a two-part housing arrangement 46*a*, 46*b* enables a positive fit and location (both axially and radially), which is mechanically robust.

The housing parts 46*a*, 46*b* may be metallic or GFRP (glass fibre reinforced plastic) materials—for example G10 GFRP or G11 GFRP. Optionally housing parts 46*a*, 46*b* comprise a thermoplastic material.

Figure 7:
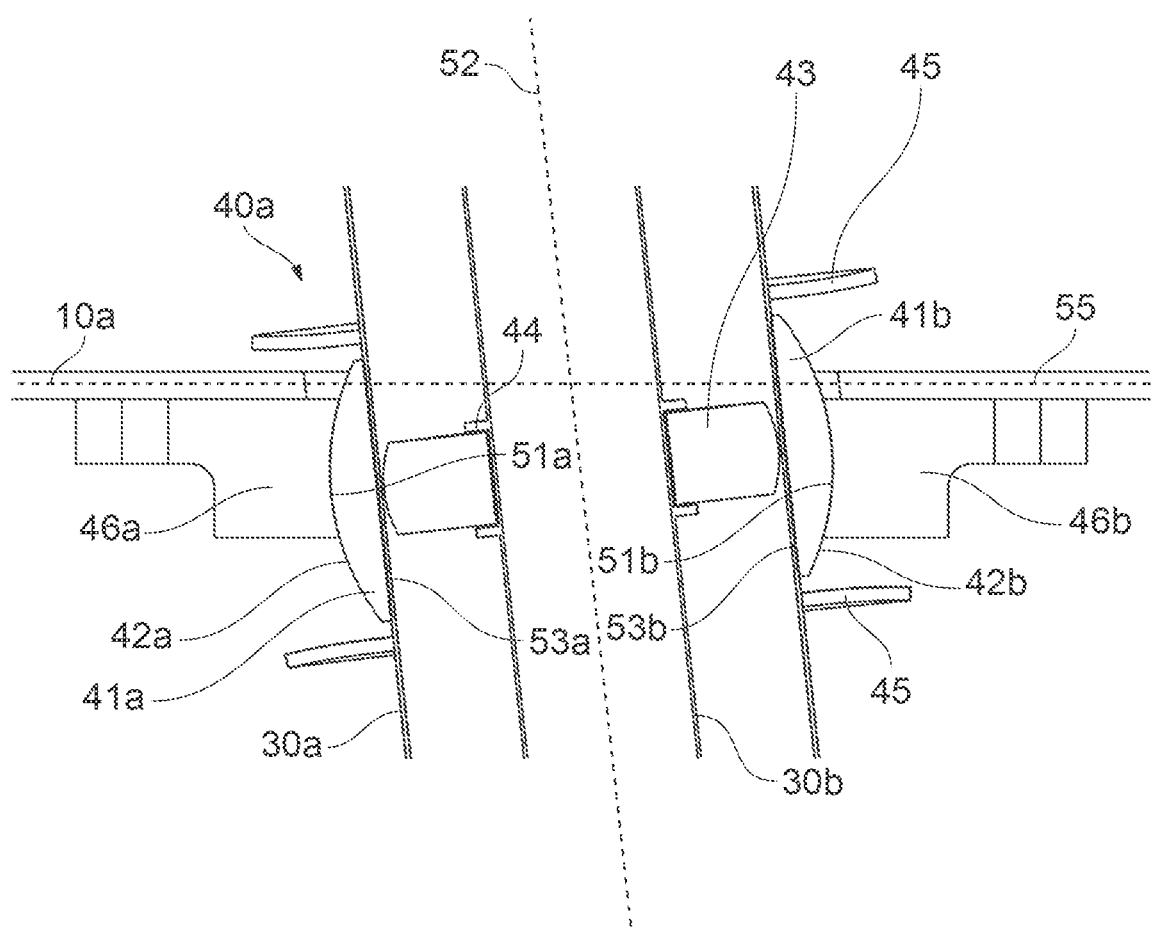
FIG. 7 is an enlarged cross-sectional view showing the detail of the spherical bearing.

As shown in FIG. 7, the ball 41*a*, 41*b* comprises a convex spherical bearing surface 42*a*, 42*b*; and the housing 46*a*, 46*b* comprises a concave spherical bearing surface 51*a*, 51*b* which mates with the convex spherical bearing surface of the ball.

The spherical bearing is configured to enable the pipework 30 to rotate relative to the rib 10*a* about three perpendicular axes, labelled X, Y, Z in FIG. 9. The pipework 30 is relatively rigid, and enabling rotation alleviates stresses induced into the pipework 30 as a result of wing flex during flight.

In this case the concave spherical bearing surface 51*a*, 51*b* of the housing contacts the convex spherical bearing surface 42*a*, 42*b* of the ball, providing a plain bearing with a sliding contact between the spherical bearing surfaces. Providing a two-part housing arrangement 46*a*, 46*b* enables a low (or zero) clearance between the spherical bearing surfaces to be achieved.

In an alternative embodiment, the spherical bearing surfaces may have ball-bearings between them, so there is no direct contact between the spherical bearing surfaces.

The fixture arrangement 40*a* is also configured to enable the pipework 30 to translate relative to the ball 41*a*, 41*b* in an axial direction aligned with a longitudinal axis 52 of the pipework 30.

This translational freedom is provided by an axial bearing, the axial bearing comprising an inner bearing surface 53*a*, 53*b* of the ball which mates with an outer surface of the pipework—in this case the outer surface of the outer pipe 30*a*. The inner bearing surface 53*a*, 53*b* of the ball and the outer surface of the outer pipe 30*a* are both cylindrical, although in other cases (for example where the cross-section of the outer pipe 30*a* is not circular) the shape may be different.

In this case the inner bearing surface 53*a*, 53*b* of the ball contacts the outer surface of the pipework, providing a plain bearing with a sliding contact between them. In an alternative embodiment, the bearing surfaces of the axial bearing may have ball-bearings between them, so there is no direct contact between them.

The inner bearing surface 53*a*, 53*b* of the ball mates with an outer surface of the pipework 30, which in this example is a metallic outer surface of the outer pipe 30*a*. In an alternative embodiment the outer surface of the pipework (which mates with the inner bearing surface 53*a*, 53*b* of the ball) may be provided by a sleeve which is fixed to the outer pipe 30*a*. Such a sleeve could be made of a low friction material such as a thermoplastic material.

The rib 10*a* has a rib plane 55 which may pass through the convex spherical bearing surface 42*a*, 42*b* of the ball as shown in FIG. 7, and/or may also pass through the bearing surfaces of the axial bearing.

The angle of the longitudinal axis 52 can vary. In FIG. 4 the longitudinal axis 52 is perpendicular to the rib plane 55, but in FIGS. 5-7 it is inclined at an oblique angle to the rib plane 55.

Figure 5:
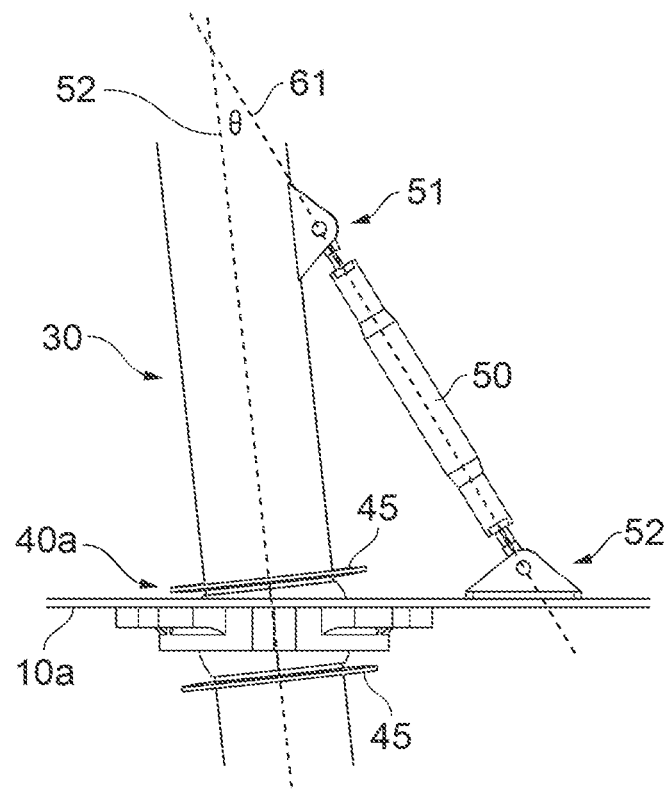
FIG. 5 shows a fixture arrangement coupling the pipework to an inboard wing rib.

As shown in FIG. 5, a first tie rod bearing 51 connects the tie rod 50 to the pipework 30, and a second tie rod bearing 52 connects the tie rod 50 to the rib 10*a*.

The first tie rod bearing 51 is configured to enable the tie rod 50 to rotate relative to the pipework 30; and the second tie rod bearing 52 is configured to enable the tie rod 50 to rotate relative to the rib 10*a*.

The tie rod 50 typically lies in a horizontal plane, in order to minimise bending of the pipework 30 relative to the wing rib 10*a* (note that bending of the wing occurs predominantly in the vertical plane).

The axial bearing enables the pipework 30 to translate relative to the ball 41*a*, 41*b* in the axial direction, and this prevents the spherical bearing from reacting axial loads aligned with the axial direction. Instead, such axial loads are reacted by the tie rod 50. Since axial loads do not need to be reacted by the spherical bearing, the spherical bearing can be relatively light and narrow. Also, higher axial loads may be reacted by the tie rod 50 than could be reacted by the spherical bearing.

The spherical bearing is configured to transmit radial load (i.e. load normal to the spherical bearing surfaces 42*a*, 42*b*, 51*a*, 51*b*) between the pipework 30 and the rib 10, but such radial load can be transmitted with a ball which is relatively narrow (in the radial sense).

The tie rod bearings 51, 52 may each be configured to enable the tie rod 50 to rotate about three perpendicular axes. The tie rod bearings 51, 52 have the same design, and only the components of the second tie rod bearing 52 are numbered in FIG. 6.

Each tie rod bearing 51, 52 comprises a bracket 54 attached to the rib 10*a* or the pipework 30; a ball 55 carried by the bracket 54; and a pin 56 which is fixed to the tie rod 50 at one end and has a spherical socket 57 at the other end. The spherical socket 57 mates with the ball 55, providing a plain spherical bearing.

The pipework 30 may include failsafe flanges 45 which are welded to the outer pipe 30*a*, one on either side of the rib 10*a*, with a gap between each failsafe flange 45 and the ball 41*a*, 41*b* (the gap may be 2 mm for example). In the event of failure of the tie rod 50, then depending on the direction of the axial load either the outboard one of the failsafe flange 45 will come into contact with the rib 10a, or the inboard failsafe flange 45 will come into contact with the housing 46a, 46b. Hence the failsafe flanges 45 prevent excessive axial loads being applied to the spherical bearing. The failsafe flanges 45 may also axially constrain the ball parts 41a, 41b which are otherwise free to slide along the pipework 30.

As shown in FIG. 5, the tie rod 50 extends along a tie rod axis 61 between the first tie rod bearing and the second tie rod bearing. The tie rod axis 61 extends at an acute angle θ to the axial direction (i.e. the longitudinal axis 52 of the pipework). The acute angle θ is as small as possible, optionally less than 30 degrees or less than 20 degrees or less than 10 degrees.

The acute angle θ may vary during flight by a small amount, due to rotation and/or translation of the pipework 30 which causes the tie rod 50 to rotate about one or both of the tie rod bearings 51, 52.

Wing bending is predominantly in the vertical plane with fore and aft deflections being negligible. Therefore with the tie rod axis 61 in the horizontal plane in line with the longitudinal axis 52 of the pipework, the pipework 30 is allowed to freely rotate in the vertical plane. Depending on the angle θ of the tie rod in relation to the pipework, the pipework will also slide by a very small distance in the ball as the pipework 30 bends and the tie rod rotates upwards, but either way the tie rod will only be reacting the axial loads (inertia and friction). The tie rod will react loads in both directions.

As shown in FIG. 9, the pipework passes through a hole 60 in the rib 10a.

FIG. 9 also shows the detail of a pipe spacer 43 which separates the inner and outer pipes 30a, 30b of the pipework 30.

Although the fixture arrangement 40a is relatively complex, it is only required at a single rib 10a, and enables relatively simple fixture arrangements 40b to be used at the other ribs 10b.

The tie rod 50 provides an independent and separate load path (optionally with the failsafe flanges 45 as a waiting failsafe) with enhanced axial load reaction.

The first tie rod bearing 51 is configured to enable the tie rod 50 to rotate relative to the pipework; and the second tie rod bearing 52 is configured to enable the tie rod 50 to rotate relative to the aircraft structure.

In the embodiment of FIGS. 1-9, the first tie rod bearing 51 is configured to enable the tie rod 51 to rotate relative to the pipework about three perpendicular axes, but in other embodiments it may be configured to enable the tie rod 51 to rotate relative to the pipework about only two perpendicular axes, or about only a single axis.

In the embodiment of FIGS. 1-9, the second tie rod bearing 52 is configured to enable the tie rod 51 to rotate relative to the aircraft structure about three perpendicular axes, but in other embodiments it may be configured to enable the tie rod 51 to rotate relative to the aircraft structure about only two perpendicular axes, or about only a single axis.

Whilst the pipework 30 in the present example is described as conveying liquid hydrogen, it will be appreciated that other fuels, and particularly cryogenic fuels, may be adopted. For example, a gaseous hydrogen fuel may be used. In this case, an inert gas may replace the vacuum in the interspace between the outer pipe 30a and the inner pipe 30b.

The pipework 30 in the present example comprises a double-walled pipe assembly. In other embodiments of the invention, the pipework may comprise a single-walled pipe, a pipe assembly comprising a series of single-walled pipes coupled end-to-end, or any other arrangement of one or more pipes.

In the embodiment of FIGS. 1-9, the aircraft pipework assembly is installed in a wing 3 of the aircraft, but in other embodiments of the invention a similar aircraft pipework assembly may be provided in another part of the aircraft, such as the fuselage 4 or a fairing. In this case the fixture arrangement will fix the pipework to a different aircraft structure, such as a fuselage rib.

In summary, embodiments of the present invention provide pipework coupled to an aircraft structure (such as a wing rib) by a fixture arrangement with a spherical bearing. A tie rod connects the pipework to the aircraft structure, via respective tie rod bearings. The fixture arrangement has an axial bearing which enables the pipework to translate relative to the spherical bearing in an axial direction aligned with a longitudinal axis of the pipework. The tie rod picks up axial load, rather than the spherical bearing, enabling the spherical bearing to be made more compact.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft pipework assembly comprising: an aircraft structure; pipework; a fixture arrangement between the pipework and the aircraft structure; a tie rod; a first tie rod bearing which connects the tie rod to the pipework; and a second tie rod bearing which connects the tie rod to the aircraft structure; wherein the fixture arrangement comprises a spherical bearing, the spherical bearing comprising a ball mounted to the pipework and a housing coupled to the aircraft structure; the ball comprises a convex spherical bearing surface; the housing comprises a concave spherical bearing surface which mates with the convex spherical bearing surface of the ball; and the fixture arrangement is configured to enable the pipework to translate relative to the ball in an axial direction aligned with a longitudinal axis of the pipework.

2. An aircraft pipework assembly according to claim 1, wherein the spherical bearing is configured to enable the pipework to rotate relative to the aircraft structure about three perpendicular axes.

3. An aircraft pipework assembly according to claim 1, wherein the spherical bearing is configured to transmit radial load between the pipework and the aircraft structure, and the radial load is normal to the spherical bearing surfaces.

4. An aircraft pipework assembly according to claim 1, wherein the concave spherical bearing surface contacts the convex spherical bearing surface of the ball.

5. An aircraft pipework assembly according to claim 1, wherein the fixture arrangement further comprises an axial bearing, the axial bearing comprising an inner bearing surface of the ball which mates with an outer surface of the pipework, and wherein the axial bearing is configured to enable the pipework to translate relative to the ball in the axial direction.

6. An aircraft pipework assembly according to claim 5, wherein the inner bearing surface of the ball contacts the outer surface of the pipework.

7. An aircraft pipework assembly according to claim 1, wherein the first tie rod bearing is configured to enable the tie rod to rotate relative to the pipework about two or three perpendicular axes.

8. An aircraft pipework assembly according to claim 1, wherein the second tie rod bearing is configured to enable the tie rod to rotate relative to the aircraft structure about two or three perpendicular axes.

9. An aircraft pipework assembly according to claim 1, wherein the ball comprises an assembly of two or more ball parts which are distributed around a circumference of the pipework.

10. An aircraft pipework assembly according to claim 1, wherein the housing comprises an assembly of two or more housing parts which are distributed around a circumference of the pipework.

11. An aircraft pipework assembly according to claim 1, wherein the tie rod extends along a tie rod axis between the first tie rod bearing and the second tie rod bearing, and the tie rod axis extends at an acute angle to the axial direction.

12. An aircraft pipework assembly according to claim 1, wherein the pipework comprises a pipe assembly, the pipe assembly comprising two or more pipe parts which are distributed in the axial direction and/or distributed radially orthogonal to the axial direction.

13. An aircraft pipework assembly according to claim 1, wherein the pipework comprises a double-walled pipe assembly, the double-walled pipe assembly comprising an inner pipe within an outer pipe.

14. An aircraft wing comprising an aircraft pipework assembly according to claim 1.

15. An aircraft wing according to claim 14, further comprising a wing box with upper and lower covers, and ribs joined to the upper and lower covers, wherein the aircraft structure is one of the ribs.

16. An aircraft wing comprising: a wing rib; pipework; a fixture arrangement between the pipework and the wing rib; and a tie rod connecting the pipework to the wing rib, wherein the fixture arrangement is configured to enable the pipework to rotate relative to the wing rib about three perpendicular axes; and the fixture arrangement is configured to enable the pipework to translate relative to the fixture arrangement in an axial direction aligned with a longitudinal axis of the pipework.

* * * * *